Feb. 20, 1951            S. RUBEN            2,542,710
ALKALINE DRY CELL
Filed Oct. 15, 1946
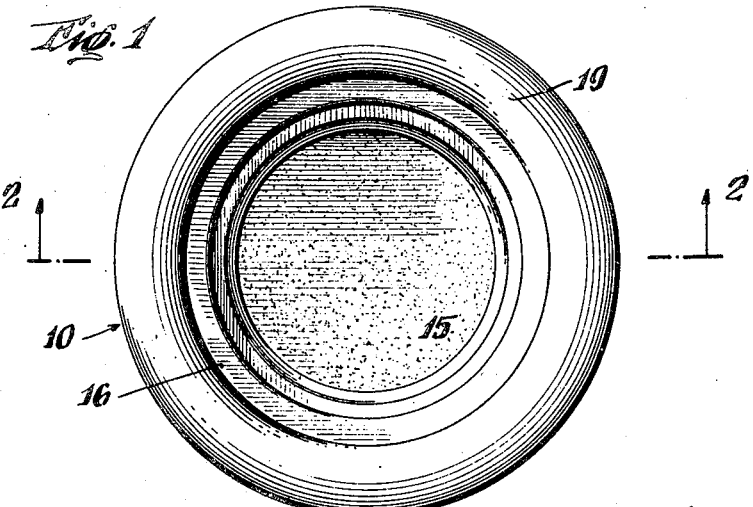
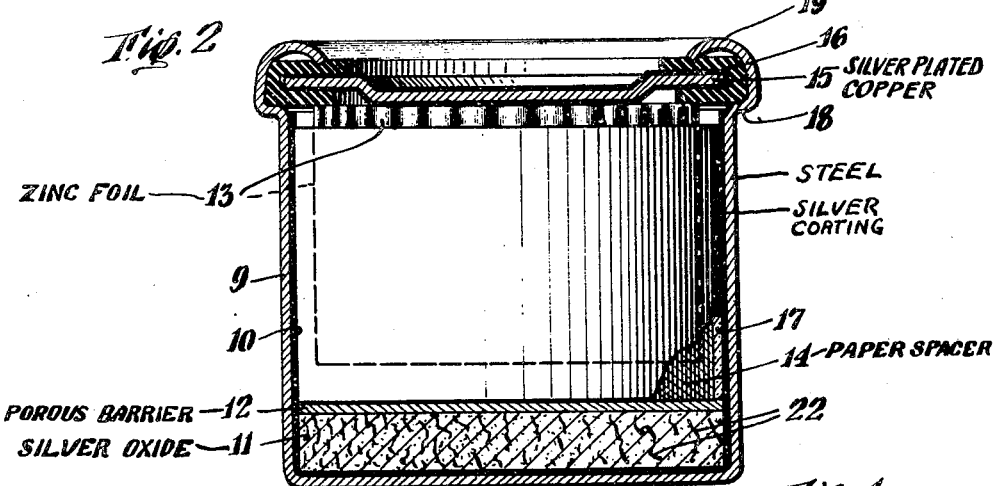
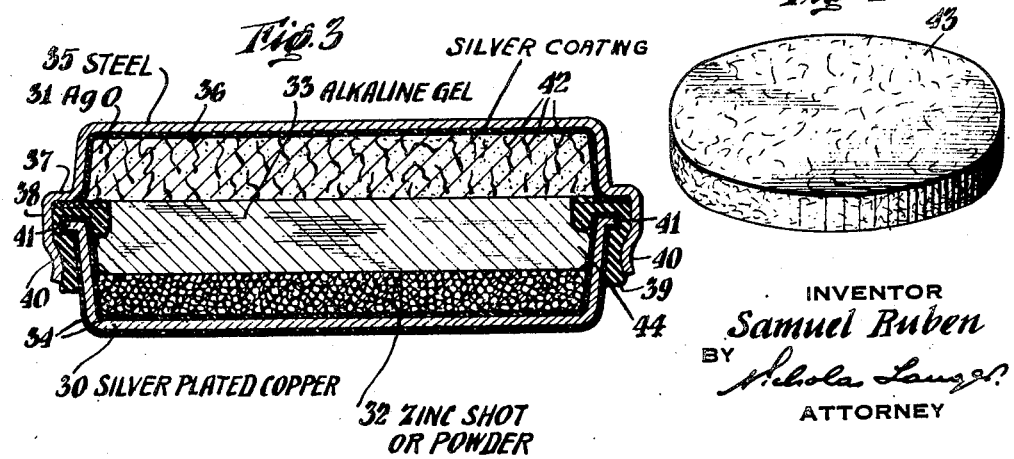
INVENTOR
Samuel Ruben
BY
ATTORNEY Patented Feb. 20, 1951

2,542,710

UNITED STATES PATENT OFFICE 2,542,710

ALKALINE DRY CELL

Samuel Ruben, New Rochelle, N. Y.

Application October 15, 1946, Serial No. 703,386

13 Claims. (Cl. 136—107)

This invention relates to alkaline dry cells.

This application is a continuation-in-part of co-pending applications Serial No. 486,367, filed May 10, 1943, now Patent #2,481,539, issued December 16, 1948, Serial No. 604,269, filed July 10, 1945, now Patent No. 2,422,045; and Serial No. 671,200, filed May 21, 1946, by Samuel Ruben.

An object of the invention is to improve alkaline primary cells.

Another object is to produce an alkaline dry cell having a silver oxide electrode.

Features of the present invention reside in the use of a coherent conductive electrode comprising compressed or bonded silver oxide powder in an alkaline primary cell and in the means for preparing and improving the properties of such a cell. In the preferred embodiments the anode is of amalgamated zinc, the cathode of silver oxide and the electrolyte of potassium hydroxide solution containing potassium zincate.

In the drawings:

Figure 1 is a top view of an alkaline dry cell embodying features of the present invention;

Figure 2 is a section on the line 2—2 of Figure 1;

Figure 3 is a section through a modified dry cell; and

Figure 4 is a perspective view of a modified spacer element for the cell of Figure 3.

Referring to Figures 1 and 2 the cell is enclosed in a steel can 9 the inside surface of which is coated with a thin silver layer 10, preferably applied by electroplating. The depolarizing electrode or cathode 11 is formed of silver oxide powder which is pressed into the bottom of the container to form a compressed coherent cathode layer in direct contact with the silver plate. Finely-divided silver oxide ($Ag_2O$) powder is preferred without the admixture of other ingredients. The other oxides of silver, such as the peroxide (AgO) can also be used. The silver oxide powder is compressed in the bottom of can 9 under relatively high pressure, such as 30,000 pounds per square inch.

A barrier layer 12, comprising a disc of a minutely-porous electrolyte permeable material such as an organic film or fibre sheet or a pressed disc of powdered organic or inorganic material which is substantially inert to the cell electrolyte is placed over the cathode layer. Suitable materials are pressed polystyrene fibre, nylon fibre, pressed powders of polystyrene, pressed discs of magnesium silicate or magnesium hydroxide powder, pressed ceramic or glass powder, or purified sheet asbestos. Glycerine plasticized films of polyvinyl alcohol as well as parchment paper of dialysis grade and regenerated sheet cellulose may also be used. The barrier prevents migration of impurities and silver compounds from the cathode to the anode. In some cases, especially where silver oxide of high purity is used, the barrier may be eliminated.

The anode-spacer assembly for the cell is formed by winding up a strip of corrugated zinc foil 13 with interleaved porous paper strips 14 in offset relation so that the edge of the foil projects slightly from one end of the roll and the edge of the paper projects at the other end of the roll. One or two layers of a pure wood cellulose fibre paper, such as filter paper or Dexter paper, or of a cotton fibre paper such as Feltril paper are suitable for the paper spacer 14. The paper strips are longer than the zinc strip and overlap it on the outside of the roll by one or two turns. The roll is inserted in an impervious insulating sleeve 17, of an alkali resistant plastic, such as polystyrene, polyethylene, neoprene, or ethyl cellulose.

The cell electrolyte preferably is formed of an aqueous solution of potassium hydroxide containing a substantial quantity of potassium zincate. The preferred range of concentration of the potassium hydroxide used in preparing the electrolyte for a cell of the construction shown in Figure 1 and most other cell structures is from thirty to fifty per cent (30 to 50%) KOH. Concentrations above and below these limits can be used but generally result in lower cell output efficiencies. However, this depends considerably upon the cell construction and conditions of use and it is feasible with certain of the structures illustrated to depart rather widely from the preferred range, even to the extent of using such a high concentration of KOH as to produce an electrolyte which is solid at normal temperatures.

For minimum attack on the amalgamated zinc anode by the electrolyte when the cell is standing on open circuit, the electrolyte should contain all the zinc it will take up at the temperatures to which the cell is to be subjected. However, I have found that proportions of zincate down to about one-half this optimum concentration will, in many cases, particularly for moderate temperature uses, produce only minute gas generation, the rate being sufficiently slow to permit generated gas to diffuse out of the cell through the grommet or other sealing means without deleteriously affecting the desired airtight enclosure of internal cell elements. The quantity of zinc which will dissolve in the electrolyte appears to be proportional to the alkali concentration. It is preferred that the electrolyte shall contain about from ten to twenty grams (10 to 20 grams) of zinc for each one hundred grams (100 gms.) of KOH used in preparing the electrolyte. It is apparent that the reaction of zinc or zinc oxide with the potassium hydroxide in preparing the electrolyte will convert part of the potassium hydroxide to potassium zincate. The best range for electrolytes made from thirty to fifty per cent (30 to 50%) KOH solution is about fifteen to seventeen grams (15 to 17 grams) of zinc per one hundred grams (100 gms.) of KOH used.

I have made a satisfactory electrolyte for cells of the type shown in Figure 1 by adding seventy-five grams (75 gms.) of C. P. potassium hydroxide (containing 88% KOH) to twenty-five milliliters (25 ml.) of water, adding twelve grams (12 gms.) of zinc oxide, stirring and heating to one hundred eighty to one hundred ninety degrees centigrade (180–190° C.). The solution was then allowed to cool to one hundred ten degrees centigrade (110° C.), after which twenty-five milliliters (25 ml.) of water was added and the solution stirred and cooled to eighty degrees centigrade (80° C.). An additional fifty milliliters (50 ml.) of water was added and a clear solution was obtained. Made in this way the electrolyte does not precipitate any zinc oxide when cooled to room temperature. This solution appears to be about seventy-five per cent (75%) saturated with zinc at room temperature.

In cases where the volume of electrolyte is relatively small a more concentrated electrolyte may be used in order to have sufficient electrolyte capacity to utilize all the zinc and depolarizer. An electrolyte containing one hundred grams (100 g.) of C. P. potassium hydroxide to one hundred milliliters (100 ml.) of water and sixteen grams (16 g.) of zinc oxide, made by a similar method, has been used in some cells of small dimensions. It requires a minimum of about 0.22 gram of this electrolyte per gram of $Ag_2O$ depolarizer for complete utilization of the electrodes. With lower KOH concentrations a larger amount of electrolyte is required.

Since amalgamated zinc foil is too brittle to wind into a roll the amalgamation of roll 13 is performed after winding. The roll is first impregnated with electrolyte which causes the spacer 14 to swell into the space afforded by the corrugations in the zinc foil. A measured quantity of mercury is distributed on top of the roll in contact with the zinc and is determined by calculation or experiment. Desirable proportions of mercury are five to twenty per cent (5 to 20%) of the weight of the zinc. The roll is then placed on a porous suction plate which draws the mercury into the roll and removes excess electrolyte. The electrolyte promotes spreading of the mercury so that the entire zinc surface becomes amalgamated in a short time.

In assembling the cell the barrier layer 12 is placed over the surface of the cathode and the electrolyte-impregnated anode roll is placed in the container with the projecting paper end in contact with the barrier. Electrolyte from the anode roll readily impregnates the barrier layer and wets the top face of the cathode.

Plastic grommet 16 is fitted over the edge of top disc 15 and the disc is then placed with its inner face in contact with the projecting edge of zinc foil anode 13. Container 10 is provided with a shoulder 18 upon which the grommet rests. The free edge 19 of container 9 is then turned or spun in over the grommet to apply pressure thereto and seal the assembly and produce an airtight cell. Grommet 16 is formed of a non-rigid alkali resistant plastic material such as rubber, neoprene, Styraloy (polystyrene and butadiene plastic), polyethylene or the like.

The top disc 15 which forms a terminal for the zinc anode and also comprises an enclosing wall for the cell is formed of copper or of silver coated copper. Copper alloys having a low polarization potential difference to zinc in the alkaline electrolyte are also suitable, such as copper-cadmium alloys and copper-zinc alloys having not more than 10% of zinc. The copper may be used uncoated, or mercury amalgamated, but it is preferred to plate the surface of the disc with silver. The silver renders the surface more rapidly amalgamable and provides an improved low resistance contact with the amalgamated zinc anode inside the cell and with external circuit connections outside the cell.

Copper top discs 15 can be readily coated with a firm thin silver coating by a contact galvanic process which consists in tumbling the discs in the following solution for five minutes:

Potassium cyanide _____grams__ 20
Silver chloride _____do_____ 6
Potassium hydroxide _____do_____ 2
Water _____liters__ 1

Upon removal from the solution, washing and drying, the discs are ready for use. The discs can also be coated with silver by electroplating.

The inner silver or copper surface of the top disc becomes amalgamated by contact with the amalgamated zinc anode thereby forming an amalgam joint or bond with the anode when the cell is assembled.

By way of example, one cell having the construction shown in Figure 1 with a cathode of silver oxide pressed to a density of 5.4 had a diameter of ⅞ inch and was ⅝ inch high. The zinc anode formed of 5 mil zinc foil corrugated with 2 mil deep corrugations, the corrugated foil strip being 0.25 inch wide and 22 inches long. The foil was wound up with two 4 mil porous paper spacers 0.34 inch wide. The zinc projected 10 mils at the top of the roll and the paper $\tfrac{3}{32}$ of an inch at the bottom. The barrier consisted of one disc of dialysis paper 3 mils thick.

Figure 3 is a sectional view of a flat primary cell having a silver oxide cathode 31, an alkaline gell electrolyte 33 and an anode 32 of amalgamated zinc powder or shot.

Anode 32 may be a porous pressed coherent body of amalgamated zinc shot or powder of graduated sizes, all of which will pass through a 28-mesh screen. The shot or powder may be amalgamated with 15% of mercury under a 15% ammonium hydroxide solution. The mixture of zinc shot or powder and mercury is stirred or tumbled in a bottle until the mercury is well distributed, after which the shot or powder is washed with water, vacuum dried at 80° C. and pressed into the anode cup 30.

Anode cup 30, comprising one of the enclosing walls of the cell is a shallow cup having an outwardly flared flange 41 at its edge and is preferably formed of copper which is coated inside and outside with a silver coating 34 and amalgamated on the inside. Amalgamated copper without silver coating is also satisfactory for the anode cup.

Electrolyte layer 33 is a self-supporting disc formed of an aqueous alkali solution immobilized as a gel. The preferred electrolyte is formed of:

C. P. potassium hydroxide (88% KOH) _____ grams__ 100
Zinc oxide _____ do____ 16
Water _____ ml__ 100

This electrolyte when made as previously described is immobilized with 6 grams of sodium carboxymethylcellulose per 100 millilitres of the alkali zincate solution. In making the electrolyte the potassium hydroxide is added to 25 millilitres of water and the zinc oxide added. The mixture is stirred and heated to 180–190° C. and then allowed to cool at 110° C., after which 25 ml. of water is added and the solution stirred and cooled at 80° C. The remaining 50 ml. of water is added, a clear solution being obtained. The sodium carboxymethylcellulose is crushed and screened through a 40 mesh screen and is added slowly to the solution, with constant stirring. This dispersion is heated to slightly below the boiling point of the mixture (117 to 120° C.), at which point a clear liquid solution is obtained. This solution is poured into a flat mold and allowed to cool and solidify, after which it is removed as an elastic or resilient sheet and discs 33 are punched from it.

A molded grommet 39 of a non-rigid, alkali-resistant plastic material such as rubber, neoprene, polyethylene, Styraloy (polystyrene and butadiene plastic) or the like is fitted over the flange 41 of cup 30.

The silver oxide cathode member 31 is compressed in the bottom of a shallow steel or iron cup 35 having a silver layer 36 covering its inside surface. The edge of cup 35 is formed with a flange having a flat circular portion 37 and a cylindrical portion 38 capable of fitting over the outer periphery of grommet 39. The silver oxide layer 31 is pressed into cup 35 to the level of flange portion 37. In assembling the cell the electrolyte disc is laid on the anode layer, the cathode member is placed down over the anode-electrolyte assembly and the edge 40 of the cathode container is spun in to compress the grommet and seal the cell.

The spacing between anode and cathode is less than the original thickness of electrolyte gel disc 33 with the result that the gel disc is compressed when the cell is assembled and its diameter expanded to substantially completely fill any free space around the outer edge of the cell, as indicated at 44. The gel retains some or all of its resiliency or tendency to return to its original shape thereby applying pressure against both anode and cathode.

One practical cell having the construction shown in Figure 3 employed a copper anode cup 30 drawn from 20-mil sheet copper and a steel cathode cup 35 drawn from 15-mil sheet steel. For the cathode 8.5 grams of granulated silver oxide which had been pelleted at 10,000 pounds per square inch was consolidated in the steel cup at 30,000 p. s. i. to a thickness of 105 mils.

The anode comprising 3.54 grams of amalgamated zinc powder containing 15% mercury was pelleted at 5,000 p. s. i. to a disc 1.065 inches in diameter and then consolidated into the silver coated copper container at 15,000 p. s. i. to a thickness of 38 mils.

The electrolyte disc 33 (of potassium hydroxide and potassium zincate gel) was a 180 mil thick molded gel disc .935 inch in diameter and weighing 3.06 grams. Since the spacing between the anode and cathode in the assembled cell was about 100 mils it is apparent that the gel disc was substantially compressed and expanded in diameter upon assembly.

A smaller cell of similar construction contained 1.125 grams of the depolarizer and .468 gram of the amalgamated zinc powder.

Figure 4 is a perspective view of a modified electrolyte-spacer element 43 for use in the cell of Figure 3, in place of element 33. Element 43 comprises a disc of porous absorbent sheet material impregnated with the electrolyte, which may be either the gel or the liquid previously described. The preferred absorbent material is a pure felted cotton fibre paper, such as Feltril paper, about 60 mils thick.

Where the volume of liquid or gel electrolyte is small it may be desirable to pre-impregnate the cathode 31 with liquid electrolyte before assembly to displace air and afford better electrolyte contact.

Other gelling agents which can be used for the electrolyte are starch and methyl cellulose.

According to a feature of the present invention the initial conductivity of the cell is improved by an aging procedure. This comprises drawing a small electric current from the cell for a preliminary aging period, before the cell is put into use. This reduces a small amount of the silver oxide to metallic silver. The reduction under these conditions appears to proceed in such a manner that tiny threads or stringers of metallic silver grow throughout the oxide layer from the electrolyte-engaging surface of the cathode terminal element or wall, such as the bottom of the silver-plated steel cup. These are shown at 22 and 42 in Figures 2 and 3 respectively.

The silver plating of the steel or other metal of the cathode terminal or container provides good electrical contact with the silver oxide and a contact in which a potential difference or polarized layer cannot develop.

While steel or iron is the preferred material for the cathode container or terminal, because of its relative inertness, strength and economy, other metals can be used as a base for the silver deposit, such as nickel or nickel alloys.

As is pointed out in application Serial No. 604,-269, the amalgamated zinc anode should have a large surface area, preferably at least equal to 20 square inches per gram of oxygen available from the depolarizer.

From the overall cell equation:

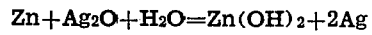

$$Zn + Ag_2O + H_2O = Zn(OH)_2 + 2Ag$$

it is apparent that one mol of silver oxide is reduced to silver for each gram atomic weight of zinc consumed at the anode. It is therefore apparent that if 100% utilization of materials is obtained an electrochemical balance between zinc and silver oxide will be present if these materials are used in the ratio of the atomic weight of zinc to the molecular weight of silver oxide, namely if the weight of zinc is 0.354 of the weight of silver oxide in the cell.

Using zinc amalgam containing 15% of mercury and a silver oxide depolarizer a balance is obtained with 0.416 gram of amalgam per gram of depolarizer.

It is apparent from the foregoing description that the novel primary cell combination described provides a leakproof dry cell which remains sealed during shelf life, during use and after end of life. This is made possible by the balance of materials of anode and cathode, the provision of inert cell enclosing walls, and the use of an alkaline electrolyte which does not react with either electrode to generate substantial gas at any time.

What is claimed is:

1. An alkaline dry cell comprising, in combination, a coherent conductive cathode comprising an oxide of silver, an anode of amalgamated zinc, an immobilized alkaline electrolyte, and a terminal for said cathode having at least the surface in contact with said cathode formed of metallic silver, said cell being characterized by the absence of free liquid electrolyte.

2. An alkaline dry cell comprising, in combination, a steel cup having the inside surface thereof coated with silver, an electrode layer of silver oxide compressed in the bottom thereof in contact with said silver coating, an immobilized body of alkaline electrolyte in contact with the surface of said oxide layer, an amalgamated zinc electrode in contact with said electrolyte, and a closure for said cell in contact with said zinc electrode comprising a metal wall having at least the surface in contact with said zinc electrode constituted by amalgamated metal selected from the group consisting of copper and silver forming an amalgam bond with the zinc electrode.

3. An alkaline dry cell comprising, in combination, a steel cup having a silver coating on the inside bottom and side wall thereof, a coherent cathode of silver oxide powder compressed in the bottom thereof in contact with said silver coating, an immobilized body of aqueous potassium hydroxide solution containing a substantial quantity of potassium zincate in contact with the surface of said cathode, an amalgamated zinc anode of large surface area in contact with said electrolyte, a terminal in contact with said anode, said terminal having at least the surface in contact with said anode constituted by amalgamated metal selected from the group consisting of copper and silver forming an amalgam bond with said anode, and an insulating sealing member insulating said terminal from said cup and sealing said cell.

4. An alkaline dry cell comprising, in combination, a first copper terminal having a silver coating thereon, a coherent conductive electrode comprising silver oxide in contact with said silver coating, an immobilized body of alkaline electrolyte in contact with the surface of said electrode, an amalgamated zinc electrode in contact with said electrolyte, and a second copper terminal in contact with said amalgamated zinc electrode, said second terminal being amalgamated and forming an amalgam bond with said zinc electrode, said cell being characterized by the absence of free liquid electrolyte.

5. An alkaline dry cell comprising, in combination, an airtight enclosure comprising a first and a second terminal and insulating sealing means therebetween, the first said terminal having at least its inner surface formed of silver, the second of said terminals having at least its inner surface formed of amalgamated metal selected from the group consisting of copper and silver, a coherent conductive cathode comprising silver oxide in contact with the silver surface of said first terminal, an amalgamated zinc anode in contact with the amalgamated surface of said second terminal and forming an amalgam bond therewith, and an immobilized body of aqueous alkali metal hydroxide electrolyte between and in contact with said anode and cathode, said electrolyte initially containing a substantial quantity of alkali metal zincate to reduce local chemical attack of said electrolyte on said anode and limit gas generation within said cell, said cell being characterized by the absenhce of free liquid electrolyte.

6. An alkaline dry cell comprising, in combination, a conductive terminal, a compressed coherent body of silver oxide powder in contact therewith, a body of alkaline electrolyte in contact with the surface of said powder body, and an amalgamated zinc electrode in contact with said electrolyte, said silver oxide body having portions thereof reduced to provide stringers of metallic silver throughout the thickness of said body.

7. An alkaline dry cell comprising, in combination, an anode comprising a body of amalgamated zinc, a coherent conductive cathode comprising an oxygen-yielding compound, said cathode being spaced from said anode, a cell enclosure enclosing said anode and cathode and having conductive terminals in contact with said anode and cathode respectively, and an electrolyte body within said enclosure and held thereby under compression in contact with said anode and cathode, said electrolyte being a self-supporting resilient alkaline gel comprising the heat reaction product of an aqueous solution of potassium hydroxide, potassium zincate and sodium carboxymethylcellulose.

8. A dry cell comprising an anode and a cathode in spaced relation, and an electrolyte body therebetween, said electrolyte body comprising a self-sustaining elastic gel which will progressively shrink during discharge of the cell, the spacing between said anode and cathode being less than the original thickness of the electrolyte body by an amount greater than the maximum shrinkage of said body whereby the electrolyte body will be held under compression between and in intimate contact with said anode and cathode throughout the useful life of the cell.

9. A dry cell comprising an anode and a cathode in spaced parallel relation, a layer of electrolyte between said anode and cathode and in contact therewith, said electrolyte layer comprising an elastic gel sheet which will progressively shrink during discharge of the cell, and clamping means applying pressure to said anode, cathode and electrolyte, the spacing between said anode and cathode being less than the original thickness of the electrolyte layer by an amount greater than the maximum shrinkage of said layer whereby the electrolyte layer will be held under compression between and in intimate contact with said anode and cathode throughout the useful life of the cell.

10. An alkaline dry cell comprising, in combination, an anode comprising a layer of amalgamated zinc, a coherent conductive cathode layer in spaced parallel relation to said anode, said cathode comprising an oxygen-yielding compound, a layer of electrolyte between said anode and cathode and in contact therewith, said electrolyte comprising a resilient alkaline gel sheet which will progressively shrink during discharge of the cell, and clamping means applying pressure to said anode, cathode and electrolyte layers, the spacing between said anode and cathode layers being less than the original thickness of said electrolyte layer by an amount greater than the maximum shrinkage of said layer whereby the electrolyte layer will be held under compression between and in intimate contact with said anode and cathode layers throughout the useful life of said cell.

11. An alkaline dry cell comprising, in combination, an anode comprising a body of amalgamated zinc, a coherent conductive cathode comprising an oxygen-yielding compound, said cathode being spaced from said anode, a cell enclosure enclosing said anode and cathode having conductive terminals in contact with said anode and cathode respectively, and an electrolyte body within said enclosure between said anode and cathode, said electrolyte body being formed of a resilient alkaline gel comprising an aqueous solution of potassium hydroxide and a gelling agent therefor which will progressively shrink during discharge of the cell, the spacing between said anode and cathode being less than the original thickness of said resilient electrolyte body by an amount greater than the maximum shrinkage of said body whereby said body will be maintained under compression and in intimate contact with said cathode and anode throughout the useful life of the cell.

12. An alkaline dry cell comprising, in combination, an amalgamated zinc anode and a coherent conductive cathode comprising an oxide of silver in spaced relation, and an electrolyte body therebetween, said electrolyte body comprising a self-sustaining elastic gel which will progressively shrink during discharge of the cell, the spacing between said anode and cathode being less than the original thickness of the electrolyte body by an amount greater than the maximum shrinkage of said body whereby said body will be held under compression between and in intimate contact with said anode and cathode throughout the useful life of the cell.

13. An alkaline dry cell comprising, in combination, an anode comprising a body of amalgamated zinc, a coherent conductive cathode comprising an oxide of silver, said cathode being spaced from said anode, a cell enclosure enclosing said anode and cathode and having conductive terminals in contact with said anode and cathode respectively, and an electrolyte body within said enclosure and held thereby under compression in intimate contact with said anode and cathode, said electrolyte being a self-supporting resilient alkaline gel comprising the heat reaction product of an aqueous solution of potassium hydroxide, potassium zincate and carboxy-methyl cellulose.

SAMUEL RUBEN.

REFERENCES CITED

The following references are of record in the file of this patent:

UNITED STATES PATENTS

| Number | Name | Date |
|---|---|---|
| 403,451 | Barrett | May 14, 1889 |
| 753,138 | Hubbell | Feb. 23, 1904 |
| 827,861 | Gardiner | Aug. 7, 1906 |
| 940,043 | Morrison | Nov. 16, 1909 |
| 1,137,226 | Manchester | Apr. 27, 1915 |
| 2,317,711 | Andre | Apr. 27, 1943 |
| 2,422,045 | Ruben | June 10, 1947 |

FOREIGN PATENTS

| Number | Country | Date |
|---|---|---|
| 16,471 | Great Britain | 1915 |

OTHER REFERENCES

Ser. No. 394,417, Marhenkel (A. P. C.), published May 11, 1943.

Hollabaugh et al., J. Ind. and Eng. Chem., October, 1945, page 943.

Trans. Electrochemical Society, vol. 90 (1946), pages 398, 399, 424, 425, 468, 469.